(12) United States Patent
Chern et al.

(10) Patent No.: US 9,273,754 B2
(45) Date of Patent: Mar. 1, 2016

(54) NON-UNIFORM AXISYMMETRIC DRIVELINE/AXLE DAMPER

(75) Inventors: Jim Chern, Troy, MI (US); Max Gibbs, Livonia, MI (US); Milind Shankarrao Ravan, Westland, MI (US); Tony Ge, Northville, MI (US); Wan Joe Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 860 days.

(21) Appl. No.: 13/406,328

(22) Filed: Feb. 27, 2012

(65) Prior Publication Data

US 2013/0225355 A1   Aug. 29, 2013

(51) Int. Cl.
*F16H 48/42* (2012.01)
*F16F 15/126* (2006.01)
*B60B 39/04* (2006.01)
*B60B 39/08* (2006.01)
*B60B 39/02* (2006.01)
*F16H 57/00* (2012.01)
*B60K 17/22* (2006.01)

(52) U.S. Cl.
CPC ............ *F16F 15/126* (2013.01); *B60B 39/021* (2013.01); *B60B 39/04* (2013.01); *B60B 39/083* (2013.01); *B60B 39/086* (2013.01); *F16H 48/42* (2013.01); *B60K 17/22* (2013.01); *F16H 2057/0012* (2013.01); *Y10T 74/2121* (2015.01)

(58) Field of Classification Search
None
See application file for complete search history.

(56) References Cited

U.S. PATENT DOCUMENTS

| 6,364,078 | B1 | 4/2002 | Parison et al. |
| 2003/0203758 | A1 | 10/2003 | Guo et al. |
| 2004/0099087 | A1 | 5/2004 | Breese et al. |
| 2009/0139811 | A1 | 6/2009 | Mochihara |
| 2009/0314129 | A1 | 12/2009 | Crist |
| 2010/0106335 | A1 | 4/2010 | Steyer et al. |

OTHER PUBLICATIONS

Anonymous, "Damper for Tire Cavity Noise and Wheel Vibration," IPCOM No. 000240144, Published Jan. 6, 2015, 3 pages.

*Primary Examiner* — Erin D Bishop
(74) *Attorney, Agent, or Firm* — James Dottavio; Alleman Hall McCoy Russell & Tuttle LLP

(57) ABSTRACT

A non-uniform axisymmetric damper device is provided, comprising a first portion that extends radially outward from an outer surface of a flange protrusion, and is spaced from and concentric with the flange protrusion. Further, a second portion of the damper device is provided with an inner surface coupled to an outer surface of the first portion and a non-uniform outer surface extending radially outward from the first portion. Accordingly, a light-weight damper is provided that allows for resonance suppression in six degrees of freedom.

17 Claims, 5 Drawing Sheets

NON-UNIFORM AXISYMMETRIC DRIVELINE/AXLE DAMPER

FIELD

The present disclosure relates to a light weight, non-uniform axisymmetric damper positioned between a differential gear box and a driveshaft of a motor vehicle to reduce noise and vibration.

BACKGROUND AND SUMMARY

Dampers to curb moan noise in a cabin of a motor vehicle are sometimes provided between a differential gear box and a drive shaft of the vehicle. However, these dampers are generally heavy, uniform axisymmetric dampers that merely provide resonance suppression related to torsion experienced by the associated components. This type of damper may be expensive and degrade fuel economy, as it adds considerable weight to the vehicle.

The inventors have recognized the issues with the above approach to reduce moan noise and offer a system to at least partly address them. In one embodiment, a non-uniform axisymmetric damper device comprises a first portion extending radially outward from an outer surface of a flange protrusion, spaced from and concentric with the flange protrusion; and a second portion with a uniform inner surface coupled to an outer surface of the first portion and a non-uniform outer surface extending radially outward from the first portion. Further, the outer surface of the second portion includes a first and second thick section of equal thickness that are spaced from one another in a radial direction by a first and second thin section of lesser thickness than the thick sections.

In this way, the non-uniform construction of the damper of the present disclosure results in a lower weight damper than uniform axisymmetric damper devices, as the thinner sections are formed with less material than the thicker sections. Further, the thicker or thinner sections may be composed of a lighter material than their thinner or thicker counterparts, allowing for further weight-saving. This decrease in material usage and resulting decrease in damper weight allows for lower production costs and enhanced fuel economy. In addition, the present disclosure may offer several advantages. For example, adjusting the non-uniform characteristics of the damper allows it to be tuned to provide resonance performance in six degrees of freedom, including torsion, bending, and translations.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Dampers may control vibration across a driveline of a motor vehicle. As noted above, however, it can be challenging to address vibration and movement in more than one degree of freedom, and typically torsion is the singular movement for which a damper compensates. The present disclosure addresses such an issue as well as others, and provides a non-uniform axisymmetric damper that allows for tunable resonance damping in six degrees of freedom in order to enhance driveline performance by decreasing noise, vibration and harshness.

Figure 1:
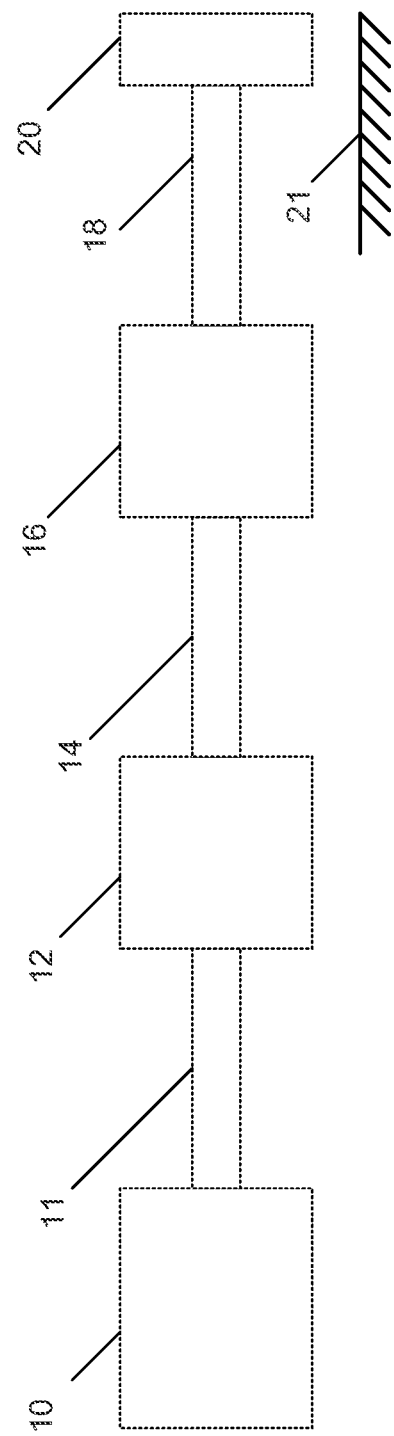
FIG. 1 shows a block diagram of a powertrain in a motor vehicle.

Turning to FIG. 1, an example powertrain of a vehicle is shown. Specifically, internal combustion engine 10 is shown coupled to transmission 12 via crankshaft 11. In this example, an automatic transmission or a manual transmission may be used. Transmission 12 may comprise an electronically controlled transmission with a plurality of selectable discrete gear ratios. Transmission 12 may also comprise various other gears such as, for example, a final drive ratio (not shown). Transmission 12 is also coupled to differential gear box 16 by driveshaft 14. Output of transmission 12 may therefore by transmitted to differential gear box 16 via driveshaft 14. Differential gear box 16 is connected to wheel 20 via axle 18, which is connectively coupled to the two wheels 20. Tire (not shown) is attached to the wheel 20 and interfaces the vehicle (not shown) to the road 21.

While the above engine and powertrain are one example that may be used, various other powertrains may be used. In particular, the systems and methods described herein may be used in any wheeled vehicles with a torque-producing powertrain in which noise, vibration, and harshness may be an issue.

Figure 2:
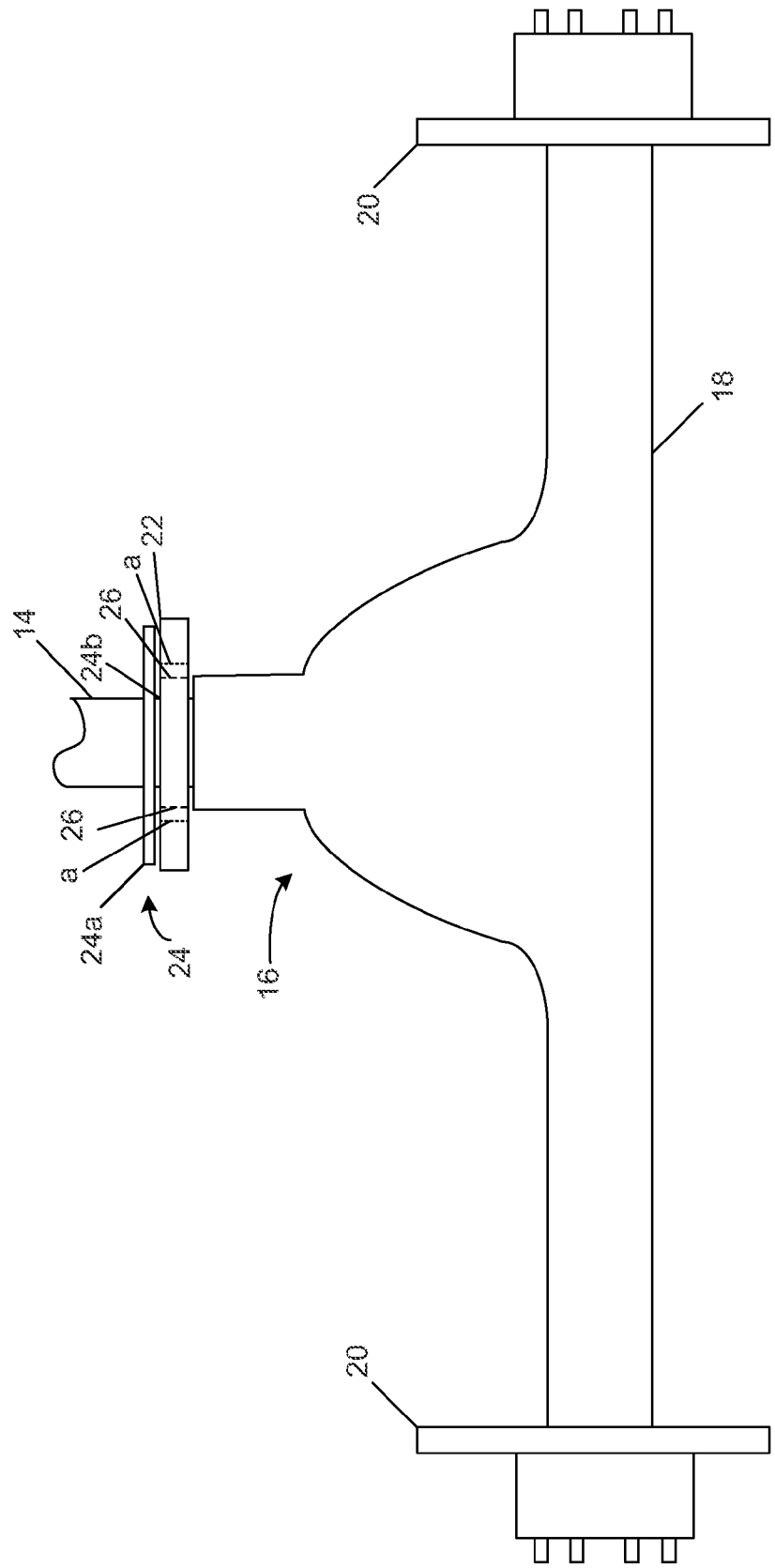
FIG. 2 shows a rear axle assembly and driveline of the powertrain of FIG. 1 with a non-uniform axisymmetric damper.

Continuing with FIG. 2, an axle assembly and driveline, for instance a rear axle of a motor vehicle with the powertrain shown in FIG. 1, is shown that features a non-uniform axisymmetric damper 22 of the present disclosure. Wheels 20 are connected via axle 18 and driven by differential gear box 16 and driveshaft 14. Differential gear box 16 is positioned such that it is perpendicular to axle 18 and drives axle 18 using drive power received from driveshaft 14. Non-uniform axisymmetric damper 22 is positioned between differential gear box 16 and driveshaft 14 in order to provide resonance damping between the differential gear box system and axle driveline. A companion flange 24 comprising companion flange wall 24a and companion flange protrusion 24b may be attached to driveshaft 14 in order to provide a coupling between driveshaft 14 and differential gear box 16. Companion flange protrusion 24b may comprise a shaft directed toward differential gear box 16, while companion flange wall 24a extends radially from driveshaft 14 and has a frontward face directed toward transmission 12 and a rearward face directed toward differential gear box 16. Damper 22 has a non-uniform outer surface characterized by a plurality of sections having different thicknesses with respect to one another. In the illustrated embodiment, the term "thickness" refers to a difference measurement of the radius of an outer, larger circle and an inner, smaller circle that defines the overall annular nature, or ring-shape, of sections of the damper 22. In this way, thickness describes the amount of material extending outward in a direction away from a center of the damper 22. The dotted lines indicated by reference letter a represent a thinner section of damper 22, as described in more detail below, with reference to FIGS. 3-6, and the dotted lines indicated by reference numeral 26 represents an inner portion of damper 22, also described in more detail below, with reference to FIGS. 3-6.

Figure 3:
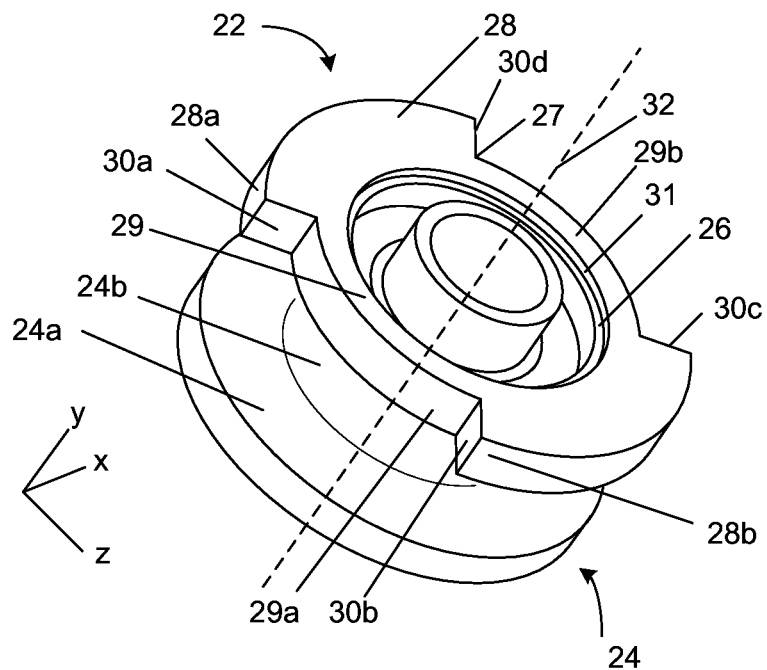
FIG. 3 shows a perspective view of the non-uniform axisymmetric damper of FIG. 2.
Figure 4:
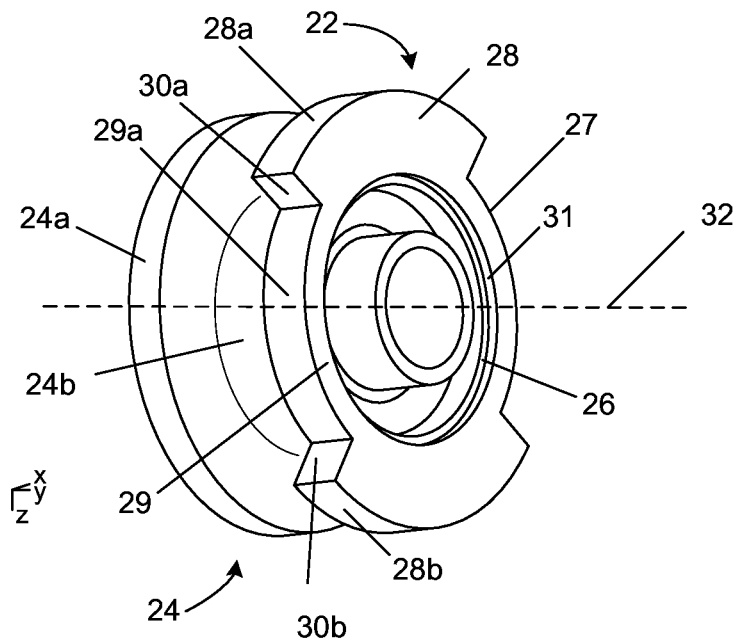
FIG. 4 shows an alternate perspective view of FIG. 3 of the non-uniform axisymmetric damper of FIG. 2.

Non-uniform axisymmetric damper 22 is shown in more detail in FIGS. 3-6 (which are drawn approximately to scale). FIGS. 3 and 4 provide perspective views of damper 22 positioned on companion flange 24. As is shown, damper 22 comprises an inner portion 26 that extends radially around flange protrusion 24b, such that it is spaced from and positioned concentrically around flange protrusion 24b. Inner portion 26 is generally uniformly ring-shaped, and may be composed of an elastic material, such as rubber. An outer surface of inner portion 26 may couple to an inner surface of an outer damper donut 27 of damper 22. In this embodiment, the term "outer surface" refers to the surface of a substantially annular structure, uniform or non-uniform, that is perpendicular to the face of the companion flange wall 24a and is positioned further away from companion flange protrusion 24b than the inner surface. Likewise, the term "inner surface" refers to the surface opposing the outer surface. The inner surface of the damper donut 27 may be uniform, extending radially around inner portion 26. The inner portion 26 may be recessed, with respect to damper donut 27, toward companion flange wall 24a, creating damper donut overlap 31. Damper donut 27 may also comprise a first, thick section 28 and a second, thin section 29 that together create a non-uniform outer surface of damper donut 27. As used herein, the thick section 28 is thicker as compared to the thin section 29. Specifically, second, thin section 29 may be trimmed with respect to first, thick section 28, creating areas of alternating thickness distributed around the circumference of damper donut 27 and the outer circumference of the inner portion 26. In other words, thick sections 28 may be formed with a greater distance between an inner surface of the damper donut 27—facing toward the flange protrusion 24b—and an outer surface of the damper donut 27—facing away from the flange protrusion 24b—than each of the thin sections 29.

Figure 5:
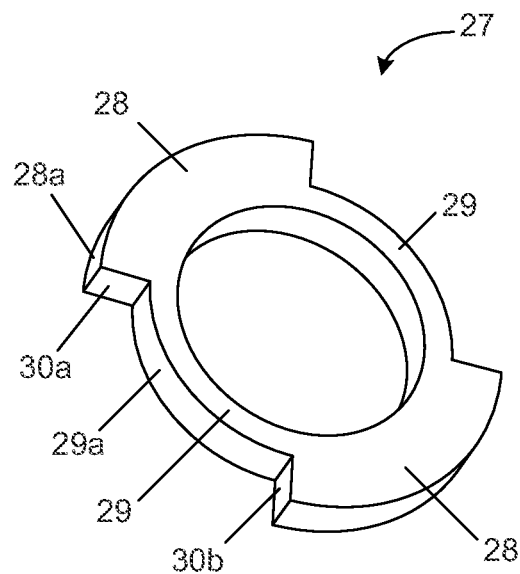
FIG. 5 shows a detailed perspective view of an embodiment of the damper doughnut portion of the non-uniform axisymmetric damper of FIG. 2.

For instance, the alternating thick and thin sections 28, 29 may result in the notched damper donut 27 depicted in FIGS. 3 and 4, and isolated in FIG. 5. The alternating thickness of sections 28 and 29 create a non-uniform outer surface that comprises a plurality of faces projected radially outward from flange protrusion 24b. First, thick section 28 has thick outer surface 28a that extends along a first arc defined by an outer circle having a radius equal to the distance from axis 32 to outer surface 28a. Progressing counterclockwise about axis 32, which passes through the center of damper 22, continuing through the center of driveshaft 14 in one direction and though the center of differential gear box 16 in the opposite direction, the arc of thick section outer surface 28a is terminated against a plane intersecting the radial thick section outer surface 28a perpendicularly, thereby creating rectangular face 30a. Face 30a contributes to the non-uniformity of damper donut 27 by causing the outer surface of the damper donut 27 to no longer progress about the arc of the thick section, and instead notch inward, toward the center of the axis 32. Face 30a extends from thick section outer surface 28a toward axis 32 to thin section outer surface 29a. Continuing the progression counterclockwise about axis 32, thin section outer surface 29a stretches along a second arc, defined by an inner circle that is concentric to the outer circle and has a radius equal to the distance from axis 32 to outer surface 29a.

Thin section outer surface 29a is terminated by a second notching face 30b, which is positioned along a plane that is perpendicular to the thin section outer surface 29a and extends upward from thin section outer surface 29a to a second thick section outer surface 28a. The above-described pattern repeats one time, resulting in an overall damper donut outer surface comprising, in order around axis 32, a first thick section outer surface 28a, a first face 30a, a first thin section outer surface 29a, a second face 30b, a second thick section outer surface 28b, a third face 30c, a second thin section outer surface 29b, and a fourth face 30d, the fourth face 30d positioned at a beginning edge of the first thick section outer surface 28a.

Figure 6:
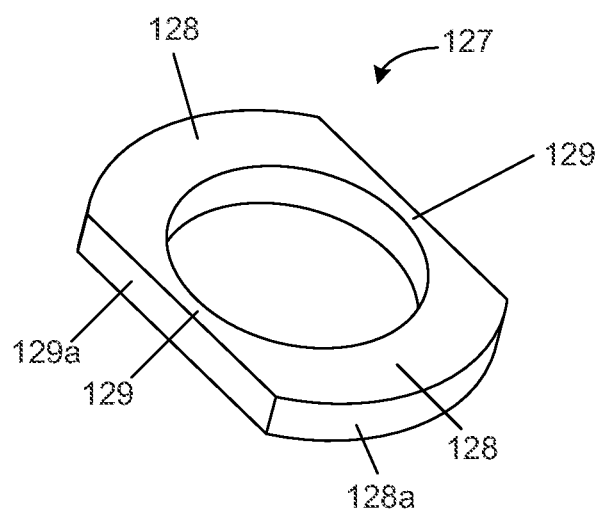
FIG. 6 shows a detailed perspective view of an embodiment of the damper doughnut portion of the non-uniform axisymmetric damper of FIG. 2.

FIGS. 5 and 6 provide detailed views of a damper donut used in two embodiments of damper 22. In a first embodiment, shown in FIG. 5, two thin sections 29 may be evenly spaced from one another along the circumference of donut 27 by two thick sections 28, such that each thick section 28 is adjacent to both thin sections 29. In another example, thin sections 29 may be unevenly spaced from one another, such that one thin section 29 and/or one thick section 28 extends along a shorter circumferential distance around donut 27 than the respective other thin section 29 and/or thick section 28. Thick sections 28 may be of equal thickness to one another, and thin sections 29 may be of equal thickness to one another. Such a non-uniform axisymmetric configuration results in less material usage and therefore lowered cost and weight and enhanced fuel economy.

The structure of the damper donut 27 may be further explained by referencing the overall annular shape of the donut 27. As shown in FIG. 5, the thin sections 29 may be viewed as sections of a thin ring having a thickness equal to the thickness of thin sections 29. A thick ring may then be viewed as coupled to and extending outwardly, in a direction away from the companion flange protrusion 24b, from the thin ring, having a thickness equal to the difference between the thicknesses of the thin sections 29 and the thick sections 28. In this way, the damper donut 27 is formed by removing the thick ring from sections in alternating positions around the donut 27 to create thick and thin sections 28, 29. For example, if the overall annular structure of damper donut 27 is divided into equally sized quarters to create four quadrants of the donut 27, the thick and thin sections 28, 29 may be positioned such that they each occupy one quadrant. In this case, each of the thick and thin sections 28, 29 are of equal width to one another such that each section occupies the same amount of an inner circumference of the damper donut 27 of axle damper 22. It is noted, however, that the positions and sizes of the thick and thin sections 28, 29 may be adjusted to tune the damper for a desired performance.

Damper donut 27 may be an integrated unit configured from one solid piece of material, such as steel, or may be a composite element. A composite donut 27 may be formed by fusing each of two extensions to a separate section of a uniform ring. The uniform ring may have a thickness equal to the thin sections 29, and the fused extensions form thicker sections with a thickness equal to thick sections 28. The extensions may be composed of a same material as the uniform ring, or may be composed of a different material from the uniform ring. In one example, the extensions may be composed of one metallic composition, while the uniform ring may be composed of a second composition of a different density, allowing for a reduction in the weight of the damper 22.

Alternatively, a composite damper donut 27 may be configured such that the donut 27 is assembled in quarters to create an annular structure comprising adjacent quadrants of two different thicknesses. In this case, the donut 27 is formed by fusing a first thin section 29 to a first thick section 28, fusing the first thick section 28 to a second thin section 29, fusing the second thin section 29 to a second thick section 28, and finally fusing the second thick section 28 to the first thin section 29. The sections may be fused such that the inner surface of the fused sections, that is, the surface coupled to the inner portion 26 of the damper donut 27, is uniform and the outer surface of the fused sections is non-uniform. In other words, the inner surfaces of the sections are aligned to one another, whereas the outer surfaces of the sections may be positioned further away (in the case of the thick sections 28) or closer to (in the case of the thin sections 29) the flange protrusion 24b.

The configuration of damper donut 27 allows for tuning of resonance performance in six degrees of freedoms in bending, torsion, and translations. These freedoms include movement in the x (axial), y (radial), z (radial), $\Theta x$ (torsion), $\Theta y$ (bending), and $\Theta z$ (bending) directions. The thick and thin sections 28, 29 of damper donut 27 create a non-cylindrical shape that allows for a different moment of inertia to be defined for each axis of rotation. Thus, by providing sections with multiple, different thicknesses, and therefore different masses, the damper donut 27 can be tuned for a specified resonance-suppressing performance level through adjustment of the overall thickness of the damper 22 and thickness and locations of the sections 28, 29. By suppressing these respective resonances, interior cab moan noise that originates from the coupling of the axle driveline and differential gear box 16 may be significantly reduced.

FIG. 6 shows an example construction of a damper donut 127 for axle damper 22. Donut 127 may still provide varying thickness about the outer surface of the damper 22, while lowering manufacturing costs by exhibiting a shape that is simpler to manufacture. Donut 127 includes two thick sections 128, which separate two thin sections 129. The thin sections 129 do not have uniform thickness, and are formed by trimming the damper donut 127 along a secant line of a thick ring of thickness equal to thick sections 128 such that a circular segment is removed from the thick ring to form each thin section 129.

Figure 7:
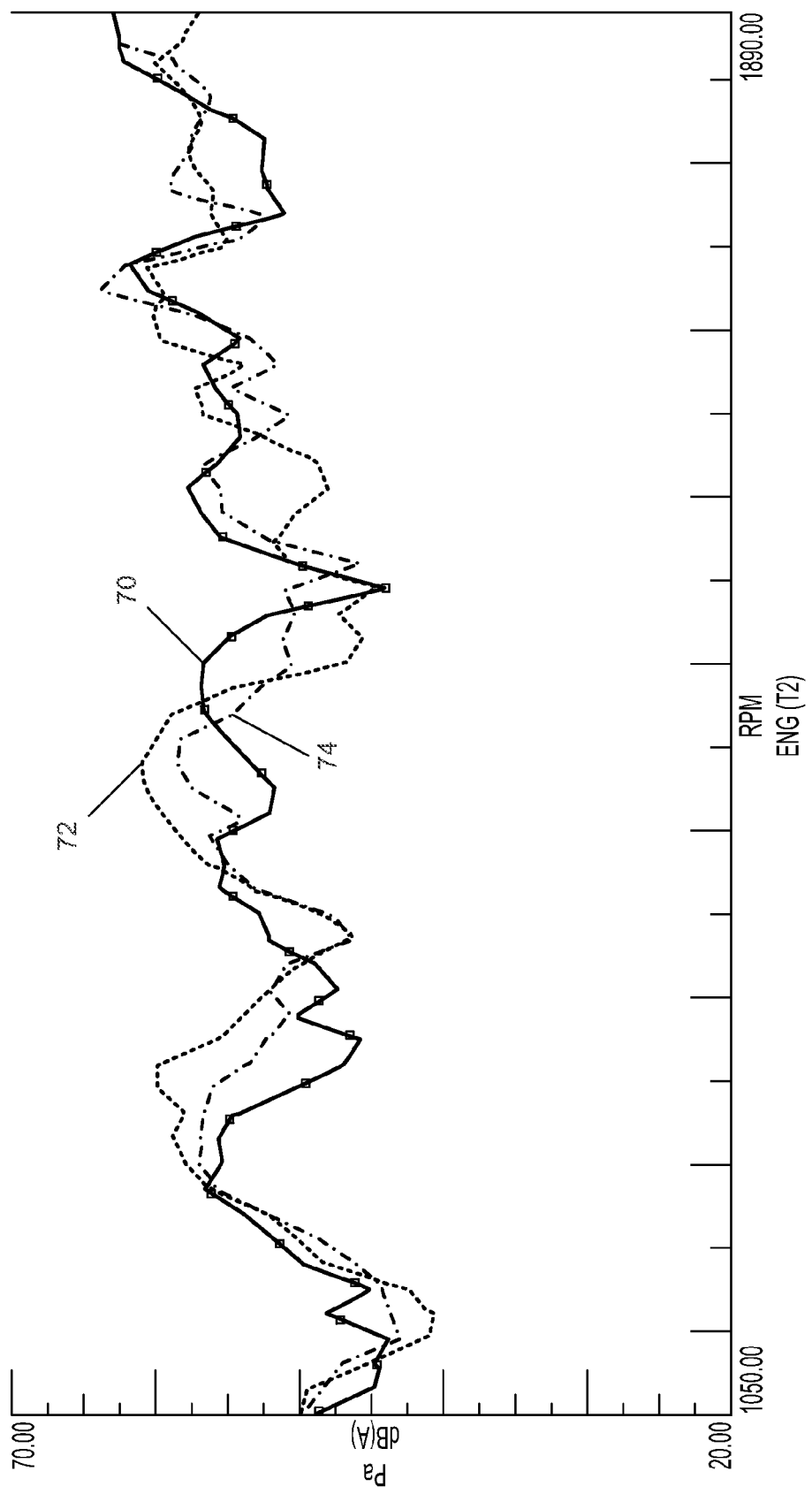
FIG. 7 is a graphical representation of vehicle test data of the non-uniform axisymmetric damper of FIG. 2 compared with alternate axisymmetric dampers.

FIG. 7 is a graphical representation of the performance of axle damper 22 as related to alternate constructions. Performance was measured by detecting an A-weighted interior cab moan noise over a range of engine speeds with different axle dampers installed on an axle of the vehicle. Line 72 represents a performance of a first uniform axisymmetric damper with uniform outer surface. Line 74 represents a performance of a second uniform axisymmetric damper with uniform outer surface and smaller width than the first axisymmetric damper. Line 70 represents a performance of the axle damper 22 of the present disclosure. As shown, axle damper 22, on average, generates a lower maximum noise across the range of engine speeds tested, especially at a target speed of 1800 rpm. At this speed, axle damper 22 outperforms the first and second uniform axisymmetric dampers by approximately 5 dB(A).

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A non-uniform axisymmetric damper device comprising:
   a first portion positioned radially outward relative to an outer surface of a flange protrusion, spaced from and concentric with the flange protrusion; and
   a second portion with an inner surface coupled to an outer surface of the first portion and a non-uniform outer surface radially outward from the first portion, wherein an outer surface of the second portion includes first and second thick sections of equal thickness that are spaced circumferentially from one another by first and second thin sections of lesser thickness than the thick sections, wherein the first thin section is positioned circumferentially between and in contact with the first thick section and the second thick section, the second thin section is positioned circumferentially between and in contact with the first thick section and the second thick section, and the second thin section is positioned radially opposite from the first thin section.

2. The damper device of claim 1, wherein the inner surface of the second portion is uniform.

3. The damper device of claim 2, wherein each of the thick and thin sections are of equal width to one another such that each section occupies one quarter of the circumference of the second portion of the damper device.

4. The damper device of claim 1, wherein the first portion of the damper device is composed of rubber and the second portion of the damper device is composed of steel.

5. The damper device of claim 1, wherein the second portion comprises a ring of a first thickness and two extensions coupled to the ring in positions equally spaced circumferentially around the ring, the extensions having equal thickness to one another.

6. The damper device of claim 5, wherein the first portion of the damper device is composed of rubber and the extensions of the second portion are composed of a different material from the ring of the second portion.

7. The damper device of claim 1, wherein the damper device is positioned between an axle differential and a driveshaft.

8. An axle system comprising:
    an axle, connectively coupling to two wheels;
    a driveshaft, comprising a companion flange extending radially outward from the driveshaft;
    a differential gear box, coupled to the axle and the driveshaft; and
    a non-uniform axisymmetric axle damper positioned between the differential gear box and the companion flange of the driveshaft, wherein the axle damper comprises a first portion, positioned radially outward relative to an outer surface of the companion flange and spaced from the companion flange, and a second portion with an inner surface coupled to an outer surface of the first portion and a non-uniform outer surface radially outward from the companion flange, an outer surface of the second portion includes first and second thick sections of equal thickness that are spaced from one another circumferentially relative to the driveshaft by first and second thin sections of lesser thickness, the two thin sections are positioned such that the first thin section is positioned circumferentially between and in contact with the first thick section and the second thick section, the second thin section is positioned circumferentially between and in contact with the first thick section and the second thick section, and the second thin section is radially opposite from the first thin section.

9. The axle system of claim 8, wherein the inner surface of the second portion of the axle damper is uniform.

10. The axle system of claim 8, wherein the two thin sections of lesser thickness are equal in thickness to one another.

11. The axle system of claim 8, wherein each of the thick and thin sections are of equal width to one another such that each section occupies the same amount of an inner circumference of the second portion of the axle damper.

12. The axle system of claim 8, wherein the first portion of the axle damper is composed of rubber and the second portion of the axle damper is composed of steel.

13. The axle system of claim 8, wherein the second portion comprises a ring of a first thickness and two extensions coupled to the ring in positions equally spaced circumferentially around the ring, the extensions having equal thickness to one another.

14. The axle system of claim 13, wherein the first portion of the axle damper is composed of rubber and the extensions of the second portion are composed of a different material from the ring of the second portion.

15. A non-uniform axisymmetric axle damper coupled to a flange of a driveshaft comprising:
    a first, uniform ring-shaped portion, composed of an elastic material, spaced from and positioned concentrically around a protrusion of the flange; and
    a second, non-uniform portion, comprising sections of alternating thickness distributed around an outer circumference of the first, uniform ring-shaped portion, the sections of alternating thickness further comprising a first thick section, a second thick section, a first thin section, and a second thin section, wherein the first thin section is positioned circumferentially between and in contact with the first thick section and the second thick section, the second thin section is positioned circumferentially between and in contact with the first thick section and the second thick section, and the second thin section is positioned radially opposite from the first thin section.

16. The non-uniform axisymmetric axle damper of claim 15, wherein the first and second thick sections are each formed with a greater distance between an inner surface of the second portion facing toward the flange protrusion and an outer surface of the second portion facing away from the flange protrusion than each of the first and second thin sections.

17. The non-uniform axisymmetric axle damper of claim 15, wherein the second, non-uniform portion is one integrated unit and composed of steel.

* * * * *